(12) United States Patent
Cranor et al.

(10) Patent No.: US 7,959,835 B2
(45) Date of Patent: Jun. 14, 2011

(54) PRESSURE ACTIVATABLE CHEMILUMINESCENT SYSTEM USEFUL FOR COVERT INTRUSION DETECTION

(75) Inventors: Earl Cranor, Longmeadow, MA (US); Eric Domingos, Chicopee, MA (US); Luis Fidalgo, Springfield, MA (US)

(73) Assignee: Cyalume Technologies, Inc., West Springfield, MA (US)

( * ) Notice: Subject to any disclaimer, the term of this patent is extended or adjusted under 35 U.S.C. 154(b) by 61 days.

(21) Appl. No.: 12/507,577

(22) Filed: Jul. 22, 2009

(65) Prior Publication Data

US 2010/0022023 A1     Jan. 28, 2010

Related U.S. Application Data

(60) Provisional application No. 61/083,026, filed on Jul. 23, 2008.

(51) Int. Cl.
*G01N 21/76*     (2006.01)
*C09K 3/00*     (2006.01)

(52) U.S. Cl. ............................ 252/700; 362/34; 436/172

(58) Field of Classification Search .................... 362/34; 252/700; 436/172
See application file for complete search history.

(56) References Cited

U.S. PATENT DOCUMENTS

| | | | |
|---|---|---|---|
| 3,590,003 A | 6/1971 | Meyers et al. |
| 4,771,724 A | 9/1988 | Baretz et al. |
| 5,770,116 A | 6/1998 | Byrne |

FOREIGN PATENT DOCUMENTS

| | | |
|---|---|---|
| EP | 227086 | 7/1987 |
| WO | WO03080756 | 10/2003 |
| WO | WO2004026990 | 4/2004 |

*Primary Examiner* — David Wu
*Assistant Examiner* — Vu A Nguyen
(74) *Attorney, Agent, or Firm* — McHale & Slavin, P.A.

(57) ABSTRACT

This invention is directed towards chemiluminescent systems useful in the practice of methods of intrusion detection, compositions useful for intrusion detection and methods for their formation, and to covert intrusion detection techniques and compositions therefore containing an infrared light generating chemiluminescent system, blended into an earthen-like carrier that enable one to detect whether any movement has breached an area during a certain time frame.

12 Claims, 1 Drawing Sheet

PRESSURE ACTIVATABLE CHEMILUMINESCENT SYSTEM USEFUL FOR COVERT INTRUSION DETECTION

REFERENCE TO RELATED APPLICATIONS

The present application claims the benefit of priority of U.S. provisional application Ser. No. 61/083,026, filed Jul. 23, 2008, the contents of which are incorporated herein by reference.

FIELD OF THE INVENTION

This invention relates generally to methods and compositions which are in a form randomly distributable upon a surface for emission of a chemiluminescent light which facilitates tracking of movements upon the surface, more particularly to a chemiluminescent system that may be pressure activatable to facilitate enabling one to detect whether any movement has breached an area during a certain time frame; and most particularly to compositions containing an infrared light generating chemiluminescent system, blended into an earthen-like carrier.

BACKGROUND OF THE INVENTION

Chemiluminscent systems are typically comprised of four active ingredients, an oxalate ester, hydrogen peroxide, a fluorescer, and a catalyst. Normally, these active ingredients are divided until time of use by placing the oxalate ester and dye in one solution that is packaged within a frangible glass ampoule. This sealed ampoule is then floated within a sealed flexible tube containing the hydrogen peroxide and catalyst in a second solution. To generate light, the user bends the flexible tube, breaking the frangible ampoule and allowing the two solutions to mix.

It is desirable to formulate a chemiluminescent system which is in a granular format that is dispersible upon a surface and which is dispersed in either an activated state, so that the act of moving along the surface results in a visible disruption of the light emission, or wherein one part of the chemistry is microencapsulated, such that the pressure of movement occurring upon the surface causes initiation of the light emission, to act as a visual track of the movement thereupon.

In accordance with the present invention, the same four active ingredients are utilized, but they are divided differently. In this instance, the hydrogen peroxide, fluorescer, and catalyst are combined within a soil colored solid matrix. At time of use, this combination is directly admixed with the oxalate ester for generation of light. Altering the oxalate ester by microencapsulating it delays the generation of light upon admixture, until the admix is stepped upon. The act of stepping on the admixture ruptures the microencapsulation around the oxalate ester and results in its interacting with the other active ingredients, initiating the chemiluminescent light generating reaction.

Often security forces need and desire to passively detect passage through various areas. Common methods to do this include removing all vegetation from outdoor areas and raking the ground into a smooth pattern. Any movement across the prepared area disturbs the smooth, raked pattern on the ground and allows for detection of the intrusion. The obvious problem with this is that the preparation of the ground by raking is obvious to all. Another problem with this method is that it is not suitable for indoor areas.

In accordance with the present invention, there has now been developed a method of preparing ground for intrusion detection that is suitable for indoor and outdoor use. This method is also covert in that the materials look like the normal contents of a floor or ground area. This new method utilizes chemiluminescent materials that have been modified to look like normal dirt or soil. In a particular embodiment, the fluorescer may be chosen so that only infrared light is produced by the chemiluminescent reaction, so that the light is only visualized by special filters, and therefore the intruders are not readily aware that they have left a covertly visible trail.

PRIOR ART

U.S. Pat. No. 4,771,724 to Baretz et al is directed toward a non-pyrotechnic lighting device whereby intrusion into a restricted area can be monitored and detected subsequent to the device having been triggered by an unsuspecting subject.

U.S. Pat. No. 5,770,116 to Byrne, Jr. teaches a kit comprising a chemiluminescent chemical capable of emitting visible light on contact with animal blood. Delivery of the composition to an area of terrain suspected of having blood deposits thereon results in emission of a luminescence enabling the hunter to recognize the presence of blood to assist in tracking a wounded game animal.

The prior art fails to teach a process or composition wherein an infrared emitting composition is formed which is capable of being spread upon an interior or exterior area, and which can be colored so as to camouflage its presence, so that an observer in possession of a device, such as a night vision eyepiece, capable of detecting light in the infrared portion of the spectrum, may visualize the telltale signs of intrusion in a covert manner.

SUMMARY OF THE INVENTION

The present invention relates to a chemiluminescent system which is provided in a granular format that is dispersible upon a surface and which is dispersed in either an activated state, so that the act of moving along the surface results in a visible disruption of the light emission, or wherein one part of the chemistry is microencapsulated, such that the pressure of movement occurring upon the surface causes initiation of the light emission, to act as a visual track of the movement thereupon. The formulation may be colored in such a manner as to blend or contrast with the surface upon which it is distributed. Dependent upon the judicious selection of fluorescers, the light generated by the formulation may be in either the visible or infrared spectrum, as is desirable.

In a particular embodiment, the present invention provides an earthen-like carrier that could be spread either indoors or outdoors on any type of walking surface where covert intrusion detection is desired. This substance will allow an observer to determine whether an intruder has breeched a surface by giving off a chemiluminescent light that can be seen by wearing night vision goggles. This will allow the observer to protect their property and detect the type of footsteps or tracks that passed through an area.

The chemiluminescent substance looks very similar to dirt or soil. Because the material looks like normal soil or dirt, it is not detectable to the naked eye. It also has the ability to camouflage itself by altering the ingredients when making the substance, depending upon what color soil or dirt is located on your property. This IR light emitting dark brown powder can be spread across a hallway, over stairs, or over any indoor area where covert intrusion detection is desired.

As will be described hereinafter, various types of chemiluminescent substances will be illustrated. These examples are merely illustrative and are not meant to limit the inventive concept in any way.

One type will emit IR light continuously for up to 5 days. It will, however, fade if exposed to UV light. If exposed to UV light, the color will fade from a dark brown to a bright orange.

Another type of chemiluminescent substance will not fade from UV light, and will continuously emit IR light for up to 3 days. Exposure to UV light (sunlight) will result in a slight change in color or shade from a dark brown to a lighter brown. However, both the before and after states continue to look like normal soil or dirt.

Accordingly, it is a primary objective of the instant invention to provide a means for intrusion detection based upon an IR emitting chemiluminescent system incorporated within or upon an earthen-like carrier material.

It is a further objective of the instant invention to provide an intrusion detection system based upon an IR emitting chemiluminescent system which will not undergo substantial color change when exposed to ultra-violet light.

It is yet another objective of the instant invention to provide a process for covert intrusion detection by distribution of an IR emitting chemiluminescent system incorporated within or upon an earthen-like carrier material upon an area to be monitored.

It is an additional objective of the instant invention to provide a dispersible formulation which may actively produce light of any spectrum desirable when distributed or which may be in the form of a pressure-activated chemiluminescent reaction system, from which light emission ensues when the material is stepped upon.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
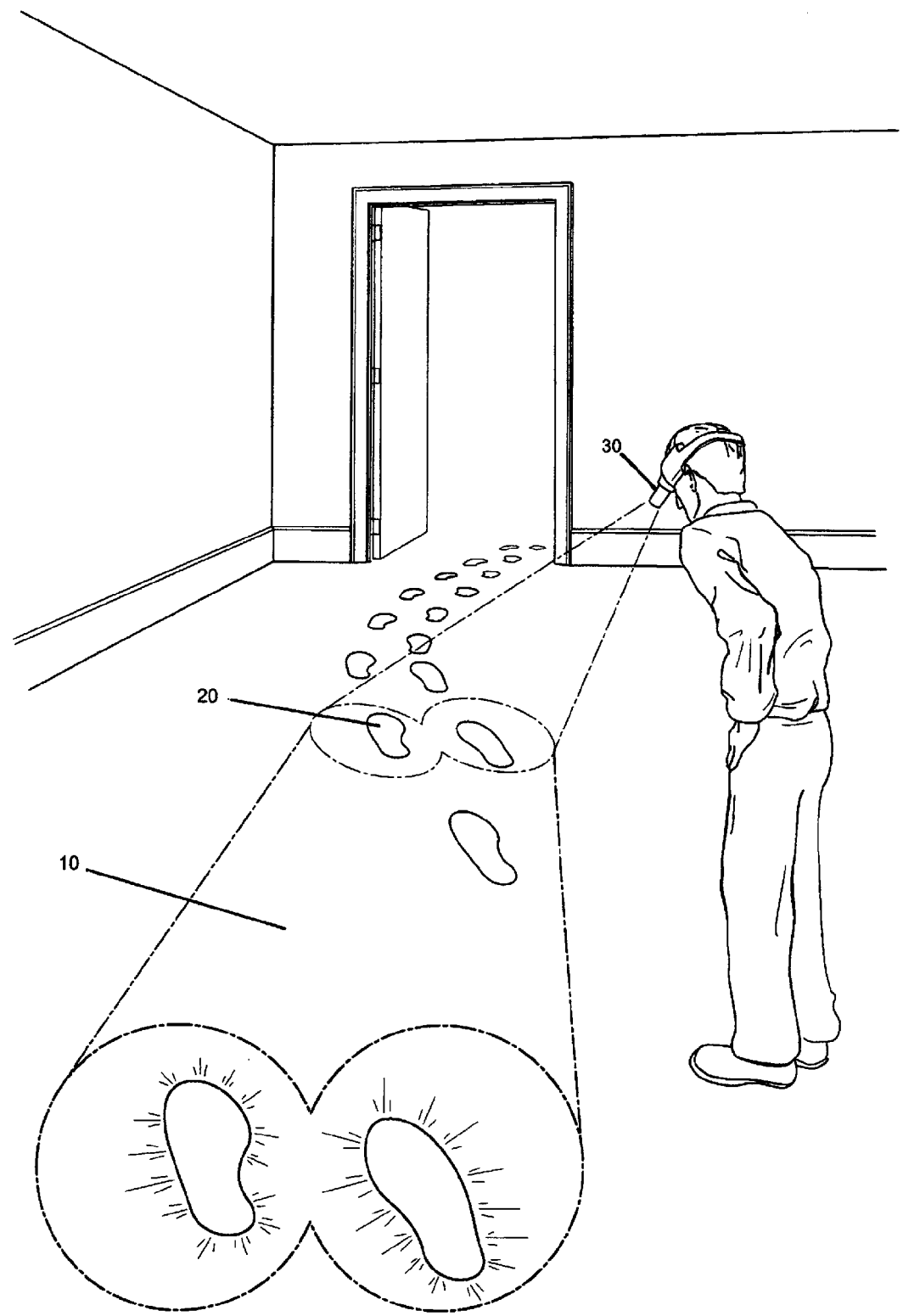
FIG. 1 illustrates an area which has been dusted with the covert intrusion composition, being observed for signs of intrusion.

Typical chemical light systems employ four active ingredients, an oxalate ester, hydrogen peroxide, a fluorescer, and a catalyst. Usually, these active ingredients are divided until time of use by placing the oxalate ester and dye in one solution that is packaged within a frangible glass ampoule. This sealed ampoule is then floated within a sealed flexible tube containing the hydrogen peroxide and catalyst in a second solution. To generate light, the user bends the flexible tube, breaking the frangible ampoule and allowing the two solutions to mix.

In accordance with the present invention, the same four active ingredients are utilized, but they are divided differently. In this instance, the hydrogen peroxide, fluorescer, and catalyst are combined within a soil colored solid matrix. At time of use, this combination is directly admixed with the oxalate ester.

It is desirable to formulate a chemiluminescent system which is in a granular format that is dispersible upon a surface and which is dispersed in either an activated state, so that the act of moving along the surface results in a visible disruption of the light emission, or wherein one part of the chemistry is microencapsulated, such that the pressure of movement occurring upon the surface causes initiation of the light emission, to act as a visual track of the movement thereupon.

Therefore, the present invention teaches an illustrative, albeit non-limiting method for forming an immobilized and colored chemiluminescent material useful for indoor or outdoor intrusion detection comprising the steps of providing a colorable absorbent media, along with one or more dyes selected to provide a desirable coloration to the color absorbent media; forming an aqueous coloring solution including an effective amount of one or more of the dyes; combining the colorable absorbable media and the aqueous coloring solution to form a paste having a desirable color; drying the paste to less than about 5% water by weight; forming a first reactant composition including an effective amount of a fluorescer and a solvent therefore; adding the first reactant composition to the paste; forming a second reactant composition including an effective amount of a peroxide, a catalyst and a solvent therefore; adding the second reactant composition to the paste containing the first reactant composition; and adding, at a desired time of use, an effective amount of an oxalate ester. This process results in the production of a chemiluminescent light emitting intrusion detection composition suitable for indoor or outdoor use is formed.

The composition can be provided in any desirable color. When the end use is for covert intrusion detection, a desirable coloration resembles normal soil or dirt, so as to camouflage the material. Further, when utilizing covert intrusion, the choice of fluorescer is selected for production of infrared light whereby covert intrusion detection is enabled. In an alternative embodiment, activation of the chemiluminescent system can be delayed and take the form of a pressure or contact initiated reaction by microencapsulation of the oxalate ester.

When it is desired to maintain the covert nature of the subject invention, the fluorescer is chosen so that it emits light only in the infrared portion of the spectrum. Light will be generated immediately when the unaltered oxalate ester is directly admixed with the soil colored solid matrix. This has great utility in indoor areas where, due to lack of windows or other openings (i.e. stairwells or basements), there is no light for Night Vision Goggles to intensify. The infrared emission of the subject invention generates enough covert light so that wearers of Night Vision Goggles can readily see.

Altering the oxalate ester by microencapsulating it delays the generation of light upon admixing with the soil colored solid matrix until the admix is stepped upon. The act of stepping on the admixture ruptures the microencapsulation around the oxalate ester and results in its interacting with the other active ingredients, initiating the chemiluminescent light generating reaction. This has particular utility in outdoor areas where knowing if the area has been crossed and which direction the persons crossing the area were going have utility (i.e. such as borders).

The above products and processes are useful in practicing a process for intrusion detection which comprises providing a light emitting chemiluminescent colored composition adapted to blend in with the surroundings upon which it is placed, and observing the emissions of the light emitting chemiluminescent colored composition for signs of disturbance by an intruder, whereby intrusion is detected.

Fluorescers useful in the present invention include but are not limited to 1-methoxy-9,10-bis(phenylethynyl)anthracene, perylene, rubrene, 16,17-didecycloxyviolanthrone, 2-ethyl-9,10-bis(phenylethynyl)anthracene; 2-chloro-9,10-bis(4-ethoxyphenyl)anthracene; 2-chloro-9,10-bis(4methoxyphenyl)anthracene; 9,10-bis(phenylethynyl)anthracene; 1-chloro-9,10-bis(phenylethynyl)anthracene; 1,8-dichloro-9,10-bis(phenylethynyl)anthracene; 1,5-dichloro-9,10-bis (phenylethynyl)anthracene; 2,3-dichloro-9,10-bis(phenylethynyl)anthracene; 5,12-bis(phenylethynyl)tetracene; 9,10-diphenylanthracene; 1,6,7,12-tetraphenoxy-N,N'-bis(2,6-diisopropylphenyl)-3,4,9,10-perylene dicarboximide; 1,6,7,12-tetraphenoxy-N,N'-bis(2,5-di-t-butylphenyl)-3,4,9,10-perylene dicarboximide; 1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-di-neopentyl-3,4,9,10-perylene dicarboximide; 1,6,7,12-tetra(p-t-butylphenoxy)N,N'-dineopentyl-3,4,9,10-perylene dicarboximide; 1,6,7,12-tetra(o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; and 1,4-dimethyl-9,10-bis(phenylethynyl)anthracene.

Catalysts useful in the present invention include but are not limited to sodium salicylate; sodium-5-fluorosalicylate; sodium-5-chlorosalicylate; sodium-5-bromosalicylate; sodium trifluoroacetate; potassium salicylate; potassium pentachlorophenolate; lithium salicylate; lithium-3-chlorosalicylate; lithium-5-chlorosalicylate; lithium-3,5-dichlorosalicylate; lithium-3,5,6-trichlorosalicylate; lithium-2-chlorobenzoate; lithium-5-t-butylsalicylate; lithium trifluoroacetate; rubidium acetate; tetrabutylammonium salicylate; tetrabutylammonium tetrafluoborate; tetraethylammonium benzoate; tetrabutylammonium benzoate; tetrabutylammonium hexafluorophosphate; tetraethylammonium perchlorate; tetrabutylammonium perchlorate; tetraoctylammonium perchlorate; tetrabutylammonium-2,3,5-trichlorobenzoate; tetramethylammonium trifluoroacetate; magnesium salicylate; magnesium-5-t-butyl-salicylate; magnesium-3-chlorosalicylate; magnesium-3,5-dichlorosalicylate; and magnesium-3,5,6-trichlorosalicylate.

Oxalates useful in the present invention include but are not limited to bis(2,4,5-trichloro-6-carbopentoxyphenyl)oxalate; bis(2,4,5-trichlorophenyl)oxalate; bis(2,4,5-tribromo-6-carbohexoxyphenyl)oxalate; bis(2-nitrophenyl)oxalate; bis(2,4-dinitrophenyl)oxalate; bis(2,6-dichloro-4-nitrophenyl)oxalate; bis(2,4,6-trichlorophenyl)oxalate; bis(3-trifluoromethyl-4-nitrophenyl)oxalate; bis(2-methyl-4,6-dinitrophenyl)oxalate; bis(1,2-dimethyl-4,6-dinitrophenyl)oxalate; bis(2,4-dichlorophenyl)oxalate; bis(2,4-dinitrophenyl)oxalate; bis(2,5-dinitrophenyl)oxalate; bis(2-formyl-4-nitrophenyl)oxalate; bis(pentachlorophenyl)oxalate; bis(1,2-dihydro-2-oxo-1-pyridyl)glyoxal; bis(2,4-dinitro-6-methylphenyl)oxalate; and bis-N-phthalimidyl oxalate.

Peroxides useful in the present invention include but are not limited to hydrogen peroxide; sodium peroxide; sodium perborate; sodium pyrophosphate peroxide; urea peroxide; histidine peroxide; t-butyl-hydroperoxide; and peroxybenzoic acid.

Dyes useful in the present invention include but are not limited to water soluble dyes such as Brown HT; Quinoline Yellow; Indigo Carmine; Brilliant Blue FCF; Ponceau 4R; Sunset Yellow; Indigotine; Fast Green FCF; Alura Red AC.

Oxalate solvents useful in the present invention include, but are not limited to a propylene glycol dialkyl ether containing one to three propylene moieties and each alkyl group is independently a straight-chain or branched-chain alkyl group containing up to 8 carbon atoms. Especially preferred first solvents are propylene glycol dialkyl ethers containing two propylene moieties such as dipropylene glycol dimethyl ether, dipropylene glycol diethyl ether and dipropylene glycol di-t-butyl ether. The particularly preferred first solvent comprises dipropylene glycol dimethyl ether, dibutyl phthalate, butyl benzoate, propylene glycol dibenzoate, and ethylhexyl diphenyl phosphate.

Activator solvents useful in the present invention include, but are not limited, to dimethyl phthalate, triethyl citrate, and ethylene glycol dibenzoate.

EXAMPLE 1

In one illustrative embodiment, about 0.15 grams of Brown HT dye were dissolved in about 35 grams of water. This colored solution was then added to about 85 grams of corn starch. The resulting brown colored paste was oven dried to less than about 5% water (by weight). Subsequently, about 0.0211 grams of didecycloxyviolanthrone were dissolved in about 14 grams of propylene glycol dibenzoate, and were added to the brown, dried corn starch. About 1.7 grams of 50% hydrogen peroxide were then mixed with about 14 grams of triethyl citrate, and added to the brown, dried corn starch mixture. The resulting product can now be admixed with about 4 grams of bis(2,4,5-trichloro-6-carbopentoxyphenyl)oxalate at the desired time of use to make an infrared light emitting dark brown powder that looks like ordinary soil or dirt.

As illustrated in FIG. 1, the IR light emitting dark brown powder 10 can be spread across a hallway, over stairs, or over any indoor area where covert intrusion detection is desired. Because the material looks like normal soil or dirt, it is not detectable to the naked eye. However, with Night Vision Goggles 30, the material is readily seen as a glowing surface that easily shows disturbances, such as footsteps 20. This material is suitable for indoor spaces and if protected from UV light (sunlight), will emit IR light continuously for up to 5 days. Exposure to UV light will result in "bleaching" and the material will change in color or shade from a dark brown to a bright orange.

EXAMPLE 2

In an alternative illustrative embodiment, about 0.15 grams of Brown HT dye, about 0.026 grams of Red Dye #40, about 0.025 grams of Yellow Dye #5, and about 0.179 grams of Blue Dye #2 were dissolved in about 35 grams of water. This colored solution was then added to about 85 grams of corn starch. The resulting brown colored paste was then oven dried to less than about 5% water (by weight). About 0.042 grams of didecycloxyviolanthrone were then dissolved in about 14 grams of propylene glycol dibenzoate, and added to the brown, dried corn starch. Subsequently, about 1.7 grams of 50% hydrogen peroxide were mixed with about 14 grams of triethyl citrate, and added to the brown, dried corn starch mixture. The resulting product can now be admixed with about 4 grams of bis(2,4,5-trichloro-6-carbopentoxyphenyl) oxalate at the desired time of use to make an infrared light emitting dark brown powder that looks like ordinary soil or dirt.

This IR light emitting dark brown powder can be spread across any outdoor space where covert intrusion detection is desired. Because the material looks like normal soil or dirt, it is not detectable to the naked eye. However, with Night Vision Goggles, the material is readily seen as a glowing surface that easily shows disturbances (such as footsteps). This material is suitable for outdoor spaces and does not require protection from UV light (sunlight). It will emit IR light continuously for up to 3 days. Exposure to UV light (sunlight) will result in a slight change in color or shade from a dark brown to a lighter brown, however, both the before and after states continue to look like normal soil or dirt.

EXAMPLE 3

In another illustrative embodiment, about 0.15 grams of Brown HT dye are dissolved in about 35 grams of water. The colored solution, thus formed, is added to about 85 grams of corn starch. The resulting brown colored paste is oven dried to less than about 5% water (by weight). Next, dissolve about 0.0211 grams of didecycloxyviolanthrone in about 14 grams of propylene glycol dibenzoate. Add this to the brown, dried corn starch. Next, mix about 1.7 grams of 50% hydrogen peroxide with about 14 grams of triethyl citrate. Add this to the brown, dried corn starch mixture. The resulting product can now be admixed with about 4 grams of microencapsulated bis(2,4,5-trichloro-6-carbopentoxyphenyl)oxalate at the desired time of use to make an infrared light emitting dark brown powder that looks like ordinary soil or dirt. The bis(2,4,5-trichloro-6-carbopentoxyphenyl)oxalate can be microencapsulated by slurrying it in a variety of suitable encapsulating agents, for example, within a solution of polyvinyl butyrate dissolved in ethanol, subsequent to which the slurry is spray dried, after which the ethanol is allowed to flash off and harden the polyvinyl butyrate and form a coating over the bis(2,4,5-trichloro-6-carbopentoxyphenyl)oxalate. This powder can be spread upon the ground and will emit light after being stepped upon.

The dark brown powder can be spread across a hallway, over stairs, or over any indoor area where covert intrusion detection is desired. Because the material looks like normal soil or dirt, it is not detectable to the naked eye. However, with Night Vision Goggles, the pressure-activated chemiluminescent reaction which ensues when the material is stepped upon, is readily seen as a glowing disturbance (such as footsteps) within a non-glowing area.

This material is suitable for indoor spaces and if protected from UV light (sunlight), will emit IR light continuously for up to 5 days, subsequent to activation. Exposure to UV light will result in "bleaching" and the material will change in color or shade from a dark brown to a bright orange.

EXAMPLE 4

In yet an additional illustrative embodiment, first dissolve about 0.15 grams of Brown HT dye, about 0.026 grams of Red Dye #40, about 0.025 grams of Yellow Dye #5, and about 0.179 grams of Blue Dye #2 in about 35 grams of water. Add this colored solution to about 85 grams of corn starch. Oven dry the resulting brown colored paste to less than about 5% water (by weight). Dissolve about 0.042 grams of didecycloxyviolanthrone in about 14 grams of propylene glycol dibenzoate. Add this to the brown, dried corn starch. Mix about 1.7 grams of 50% hydrogen peroxide with about 14 grams of triethyl citrate. Add this to the brown, dried corn starch mixture. The resulting product can now be admixed with about 4 grams of microencapsulated bis(2,4,5-trichloro-6-carbopentoxyphenyl)oxalate at the desired time of use to make a dark brown powder that looks like ordinary soil or dirt. The bis(2,4,5-trichloro-6-carbopentoxyphenyl)oxalate can be microencapsulated by slurrying it within molten paraffin and then spray drying the slurry and allowing the molten paraffin to harden and form a coating over the bis(2,4,5-trichloro-6-carbopentoxyphenyl)oxalate. This powder can be spread upon the ground and will emit light after being stepped upon.

This IR light emitting dark brown powder can be spread across any outdoor space where covert intrusion detection is desired. Because the material looks like normal soil or dirt, it is not detectable to the naked eye. However, with Night Vision Goggles, the pressure-activated chemiluminescent reaction which ensues when the material is stepped upon, is readily seen as a glowing disturbance (such as footsteps) within a non-glowing area.

This material is suitable for outdoor spaces and does not require protection from UV light (sunlight). It will emit IR light continuously for up to 3 days after being stepped upon. Exposure to UV light (sunlight) will result in a slight change in color or shade from a dark brown to a lighter brown. However, both the before and after states continue to look like normal soil or dirt.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process for forming a chemiluminescent earthen-like covert intrusion detection composition comprising:
dissolving about 0.15 grams of Brown HT dye in about 35 grams of water to form a colored solution;
adding the colored solution to about 85 grams of corn starch to form a brown colored earthen-like paste;
drying said brown colored earthen-like paste to less than about 5% water by weight; dissolving about 0.0211 grams of didecycloxyviolanthrone in about 14 grams of propylene glycol dibenzoate to form a first reactant composition;
adding said first reactant composition to said dried brown colored earthen-like paste;
mixing about 1.7 grams of 50% hydrogen peroxide with about 14 grams of triethyl citrate to form a second reactant composition;

adding said second reactant composition to said dried brown colored earthen-like paste; and adding, at the desired time of use, about 4 grams of bis(2,4,5-trichloro-6-carbopentoxyphenyl) oxalate;

whereby an infrared light emitting covert intrusion detection composition is formed.

2. The process for forming a chemiluminescent earthen-like covert intrusion detection composition in accordance with claim 1 wherein said bis(2,4,5-trichloro-6-carbopentoxyphenyl) oxalate is microencapsulated.

3. The process for forming a chemiluminescent earthen-like covert intrusion detection composition in accordance with claim 2 wherein said bis(2,4,5-trichloro-6-carbopentoxyphenyl) oxalate is microencapsulated by slurrying it in a polyvinyl butyrate encapsulating agent dissolved in ethanol, subsequent to which the slurry is spray dried, after which the ethanol is allowed to flash off and harden the polyvinyl butyrate and form a coating over the bis(2,4,5-trichloro-6-carbopentoxyphenyl) oxalate.

4. A process for forming chemiluminescent earthen-like covert intrusion detection composition comprising:

dissolving about 0.15 grams of Brown HT dye, about 0.026 grams of Red Dye #40, about 0.025 grams of Yellow Dye #5, and about 0.179 grams of Blue Dye #2 in about 35 grams of water to form a colored solution;

adding the colored solution to about 85 grams of corn starch to form a brown colored earthen-like paste;

drying said brown colored earthen-like paste to less than about 5% water by weight;

dissolving about 0.042 grams of didecycloxyviolanthrone in about 14 grams of propylene glycol dibenzoate to form a first reactant composition;

adding said first reactant composition to said dried brown colored earthen-like paste;

mixing about 1.7 grams of 50% hydrogen peroxide with about 14 grams of triethyl citrate to form a second reactant composition;

adding said second reactant composition to said dried brown colored earthen-like paste; and adding, at the desired time of use, about 4 grams of bis(2,4,5-trichloro-6-carbopentoxyphenyl) oxalate;

whereby an infrared light emitting covert intrusion detection composition is formed.

5. The process for forming a chemiluminescent earthen-like covert intrusion detection composition in accordance with claim 4 wherein said bis(2,4,5-trichloro-6-carbopentoxyphenyl) oxalate is microencapsulated.

6. The process for forming a chemiluminescent earthen-like covert intrusion detection composition in accordance with claim 5 wherein said bis(2,4,5-trichloro-6-carbopentoxyphenyl) oxalate is microencapsulated by slurrying it within molten paraffin and then spray drying the slurry and allowing the molten paraffin to harden and form a coating over the bis(2,4,5-trichloro-6-carbopentoxyphenyl) oxalate.

7. A chemiluminescent earthen-like covert intrusion detection composition comprising in combination:

a colored solution containing about 0.15 grams of Brown HT dye dissolved in about 35 grams of water to form a colored solution;

about 85 grams of corn starch;

about 0.0211 grams of didecycloxyviolanthrone dissolved in about 14 grams of propylene glycol dibenzoate to form a first reactant composition;

about 1.7 grams of 50% hydrogen peroxide dissolved with about 14 grams of triethyl citrate to form a second reactant composition; and about 4 grams of bis(2,4,5-trichloro-6-carbopentoxyphenyl) oxalate.

8. The chemiluminescent earthen-like covert intrusion detection composition of claim 7 wherein said bis(2,4,5-trichloro-6-carbopentoxyphenyl) oxalate is microencapsulated.

9. The composition of claim 8 wherein said bis(2,4,5-trichloro-6-carbopentoxyphenyl) oxalate is microencapsulated by slurrying within a solution of polyvinyl butyrate dissolved in ethanol, subsequent to which the slurry is spray dried, after which the ethanol is allowed to flash off and harden the polyvinyl butyrate and form a coating over the bis(2,4,5-trichloro-6-carbopentoxyphenyl) oxalate.

10. A chemiluminescent earthen-like covert intrusion detection composition comprising in combination:

about 0.15 grams of Brown HT dye, about 0.026 grams of Red Dye #40, about 0.025 grams of Yellow Dye #5, and about 0.179 grams of Blue Dye #2 dissolved in about 35 grams of water to form a colored solution;

about 85 grams of corn starch to form a brown colored earthen-like paste;

about 0.042 grams of didecycloxyviolanthrone dissolved in about 14 grams of propylene glycol dibenzoate to form a first reactant composition;

about 1.7 grams of 50% hydrogen peroxide dissolved with about 14 grams of triethyl citrate to form a second reactant composition; and about 4 grams of bis(2,4,5-trichloro-6-carbopentoxyphenyl) oxalate.

11. The chemiluminescent earthen-like covert intrusion detection composition of claim 10 wherein said bis(2,4,5-trichloro-6-carbopentoxyphenyl) oxalate is microencapsulated.

12. The composition of claim 11 wherein said bis(2,4,5-trichloro-6-carbopentoxyphenyl) oxalate is microencapsulated by slurrying it within molten paraffin and then spray drying the slurry and allowing the molten paraffin to harden and form a coating over the bis(2,4,5-trichloro-6-carbopentoxyphenyl) oxalate.

* * * * *